US012692350B2

(12) United States Patent　　　　(10) Patent No.:　US 12,692,350 B2
LaPlant et al.　　　　　　　　　　　 (45) Date of Patent:　　　Jul. 28, 2026

(54) SYSTEM FOR MANUFACTURING POLYMER PARTS VIA ADDITIVE MANUFACTURING

(71) Applicant: Honeywell Federal Manufacturing & Technologies, LLC, Kansas City, MO (US)

(72) Inventors: Steven Todd LaPlant, Kansas City, MO (US); Benjamin Douglas Williams, Shawnee, KS (US); Jacob Ryan McLaughlin, Leawood, KS (US); Jackson Dale White, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/659,631

(22) Filed: May 9, 2024

(65) Prior Publication Data

US 2025/0346725 A1　　Nov. 13, 2025

(51) Int. Cl.
| | |
|---|---|
| *B29C 64/295* | (2017.01) |
| *B33Y 30/00* | (2015.01) |
| *C08J 3/09* | (2006.01) |
| *C08L 21/00* | (2006.01) |
| *B33Y 70/10* | (2020.01) |

(52) U.S. Cl.
CPC ............. *C08J 3/095* (2013.01); *B29C 64/295* (2017.08); *B33Y 30/00* (2014.12); *C08L 21/00* (2013.01); *B33Y 70/10* (2020.01); *C08J 2321/02* (2013.01)

(58) Field of Classification Search
CPC ................................ B29C 64/20; B33Y 70/00
See application file for complete search history.

(56) References Cited

U.S. PATENT DOCUMENTS

| | | | | |
|---|---|---|---|---|
| 10,926,460 | B2 * | 2/2021 | Prakash | .................. C22C 26/00 |
| 2018/0370080 | A1 * | 12/2018 | McCarthy | .............. B29C 39/36 |
| 2021/0260249 | A1 * | 8/2021 | Alimperti | ........... A61L 24/0084 |

(Continued)

FOREIGN PATENT DOCUMENTS

| | | | |
|---|---|---|---|
| CN | 117301505 | * | 12/2023 |
| EP | 3628418 | * | 4/2020 |
| KR | 100880593 | * | 1/2009 |

(Continued)

OTHER PUBLICATIONS

3D Printing of a Biocompatible Slurry using Direct Ink Writing (DIW), Penn State College of Engineering, Bernard M. Gordon Learning Factory, Fall 2020.

(Continued)

*Primary Examiner* — Edmund H Lee
(74) *Attorney, Agent, or Firm* — Erise IP, P.A.

(57) ABSTRACT

Systems and methods for forming a slurry and manufacturing a part with the slurry are disclosed. The slurry may comprise a solvent, a polymer soluble in the solvent, and additives insoluble in the solvent. The polymer may be dissolved in the solvent such that the slurry has a lower viscosity than a viscosity of the polymer, which may enable the slurry to flow and be utilized by a manufacturing device. Once manufactured, the solvent may be removed from the slurry material, and the manufactured part may have the original viscosity of the polymer.

13 Claims, 3 Drawing Sheets

(56)          References Cited

U.S. PATENT DOCUMENTS

2023/0321910 A1 * 10/2023 Chung ................. B29C 64/371
                                              264/494

FOREIGN PATENT DOCUMENTS

| KR | 20200098531 | * | 8/2020 |
| KR | 102462862 | * | 11/2022 |
| KR | 102508807 | * | 3/2023 |
| TW | 202402497 | * | 1/2024 |

OTHER PUBLICATIONS

Bin Zhang, et al., Solvent-based Extrusion 3D Printing for the Fabrication of Tissue Engineering Scaffolds, International Journal of Bioprinting, (2020)—vol. 6, Issue 1.
S. Tagliaferri, et al., Direct ink writing of energy materials, Materials Advances, Mater. Adv., 2021, 2, 540-563.
Saikat Sinha Ray, et al., Solvent based Slurry Stereolithography 3D printed hydrophilic ceramic membrane for ultrafiltration application, Ceramics International, https://doi.org/10.1016/j.ceramint.2020.02.010.
Yucheng Deng, et al., Fabrication of Energetic Composites with 91% Solid Content by 3D Direct Writing, Micromachines 2021, 12, 1160. https://doi.org/10.3390/mi12101160.

\* cited by examiner

300

400

SYSTEM FOR MANUFACTURING POLYMER PARTS VIA ADDITIVE MANUFACTURING

STATEMENT OF GOVERNMENT SUPPORT

This invention was made with government support under Contract No.: DE-NA-0002839 awarded by the United States Department of Energy/National Nuclear Security Administration. The government has certain rights in the invention.

BACKGROUND

1. Field

Embodiments of the present disclosure relate to systems and methods for manufacturing polymer components. More specifically, embodiments of the present disclosure relate to manufacturing polymeric components with a slurry.

2. Related Art

Highly viscous polymers, such as synthetic rubbers and vinyl copolymer elastomers, are often filled with additives to adjust the properties of the polymers. Typically, incorporating additives into polymer material involves a mechanical mixing process such as high shear mixing or roll milling. These processes are limited in the amount of filler that can be added, as either the polymer can break due to the force required to press the filler into the polymer or the mixing device or roll mill itself can become damaged as the amount of filler that is being added is increased. Thus, polymers can be limited to lower amounts of added filler than are desired for certain applications.

Additionally, it may be desirable to form parts using techniques such as additive manufacturing that enable greater control over the final part. However, high viscosity and/or high hardness polymers (e.g., having a Shore durometer value greater than 90 Shore A) are too viscous to be extruded via an additive manufacturing device. Improvements in forming filled polymeric components are needed.

SUMMARY

Embodiments of the present disclosure solve the above-mentioned problems by providing systems and methods for manufacturing polymer parts by forming a slurry comprising a solvent, a polymer, and one or more additives and extruding the slurry. The slurry may be formed by mixing the solvent, the polymer, and one or more additives. The polymer may be soluble in the solvent such that mixing the polymer with the solvent dissolves the polymer and produces the slurry, which may have a first viscosity lower than a second viscosity of the polymer, where the first viscosity is extrudable by the additive manufacturing device. Dissolving the polymer in the solvent may allow for higher durometer polymers (e.g., polymers with a hardness value greater than 90 Shore A) to be printed via an additive manufacturing device or molded via standard compression/injection molding operations. Additionally, increased percentages of additives (e.g., greater than 10% by weight, greater than 20% by weight, greater than 30% by weight, greater than 40% by weight, greater than 50% by weight, greater than 60% by weight, greater than 70% by weight, greater than 80% by weight, or greater than 90% by weight) in polymers may be achieved because the additives can be mixed into the less viscous slurry rather than being compounded into the highly viscous polymer. The slurry may comprise any percentage of additives as long as the slurry is flowable. Further, embodiments of the present disclosure may reduce the footprint required to fabricate filled polymer parts by eliminating the need to use a roll mill or compression press.

Clause 1. A system for manufacturing polymer parts via a method selected from a group consisting of: additive manufacturing, transfer molding, injection molding, compression molding, casting, coating, and foam forming, the system comprising: a slurry comprising a solvent, one or more additives that are insoluble in the solvent, and a polymer that is soluble in the solvent, the polymer having a first viscosity, wherein the solvent dissolves the polymer to form the slurry having a second viscosity lower than the first viscosity, wherein a ratio of the solvent to the polymer in the slurry is in a range of 3:2 to 4:1; a manufacturing device that manufactures a part with the slurry; and a curing device for curing the part to remove the solvent such that the part has the first viscosity.

Clause 2. The system of clause 1, wherein the one or more additives are electrically conductive.

Clause 3. The system of clause 1, wherein the polymer has a hardness scale durometer value of at least 15 Shore D.

Clause 4. The system of clause 1, wherein the polymer comprises at least one of a vinyl copolymer elastomer, ethylene-vinyl acetate, polyvinyl chloride, polyvinyl alcohol, or polyvinyl ether, wherein the solvent comprises tetrahydrofuran.

Clause 5. The system of clause 1, further comprising: a second slurry distinct from the first slurry, wherein the part is formed from the first slurry and the second slurry.

Clause 6. The system of clause 1, wherein the slurry comprises at least 10 percent by weight of the one or more additives.

Clause 7. The system of clause 1, wherein the polymer comprises a synthetic rubber.

Clause 8. A system for manufacturing polymer parts, comprising: a slurry comprising a solvent, a polymer having a first viscosity, and one or more additives, wherein the solvent dissolves the polymer to form the slurry having a second viscosity lower than the first viscosity; and an additive manufacturing device comprising: a build surface for receiving the slurry; and a print head for selectively extruding the slurry onto the build surface to form a part, wherein the solvent is removed from the part after printing such that the part comprises the polymer and the one or more additives.

Clause 9. The system of clause 8, wherein a ratio of the solvent to the polymer in the slurry is within a range of 3:2 to 3:1.

Clause 10. The system of clause 8, further comprising a mixer configured to form the slurry by mixing the solvent, the polymer, and the one or more additives.

Clause 11. The system of clause 8, further comprising a curing device configured to cure the part, thereby facilitating removal of the solvent from the part and crosslinking the polymer.

Clause 12. The system of clause 8, wherein the slurry comprises at least 10 percent by weight of the one or more additives.

Clause 13. The system of clause 12, wherein at least one of the one or more additives are electrically conductive and insoluble in the solvent.

Clause 14. The system of clause 8, wherein the part has the first viscosity.

Clause 15. A method for manufacturing polymer parts, the method comprising: forming a slurry by combining a solvent, a polymer that is soluble in the solvent and has a first viscosity, and one or more additives that are insoluble in the solvent, wherein the slurry has a second viscosity lower than the first viscosity; extruding the slurry via an additive manufacturing device to form a part; and removing the solvent from the part such that the part has the first viscosity.

Clause 16. The method of clause 15, further comprising: curing the part via a curing device configured to provide heat to the part, thereby removing the solvent from the part and crosslinking the polymer.

Clause 17. The method of clause 15, wherein a ratio of the solvent to the polymer in the slurry is within a range of 3:2 to 3:1, wherein the slurry comprises at least 10 percent by weight of the one or more additives.

Clause 18. The method of clause 15, wherein the polymer comprises at least one of a vinyl copolymer elastomer, an ethylene-vinyl acetate, a polyvinyl chloride, a polyvinyl alcohol, or a polyvinyl ether, wherein the solvent comprises tetrahydrofuran.

Clause 19. The method of clause 15, wherein the polymer has a hardness scale durometer value of at least 30 Shore A.

Clause 20. The method of clause 15, further comprising: perforating a surface of the part to facilitate removal of the solvent from the part.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
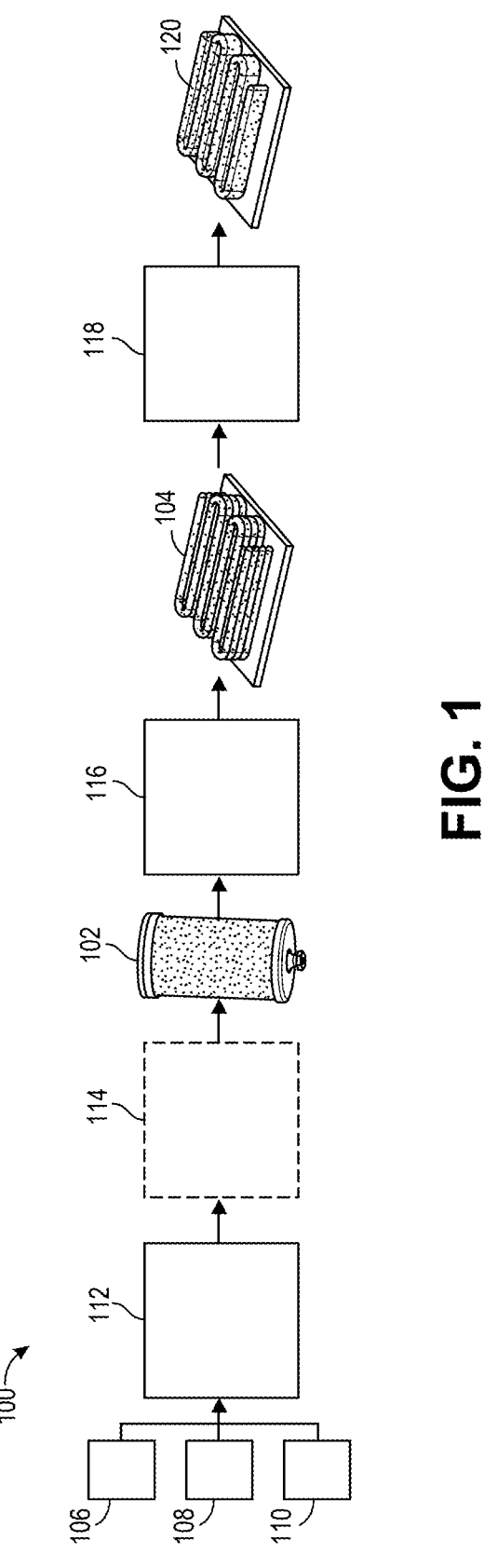
FIG. 1 depicts an exemplary system for forming a slurry and manufacturing a part using the slurry for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

Embodiments of the present disclosure are generally directed to a slurry for use in manufacturing processes, which may comprise a solvent, a polymer soluble in the solvent such that the solvent can dissolve the polymer, and one or more additives that are insoluble in the solvent. By dissolving the polymer in the solvent, the slurry may have a viscosity lower than a viscosity of the undissolved polymer. The slurry may be formed with a viscosity that enables extrusion via an additive manufacturing device. Alternatively, or additionally, the slurry may be formed with a viscosity that enables any of additive manufacturing, compression molding, injection molding, transfer molding, casting, coating, spraying, painting, or foaming via a manufacturing device. In some embodiments, the viscosity of the slurry refers to the viscosity of the mixture formed when the polymer is dissolved in the solvent (i.e., not considering the viscosity of the additives). It will be appreciated that because the additives may be insoluble in the solvent, the additives may have a different viscosity than the solvent/polymer mixture.

Once manufactured, the part may be cured to remove the solvent. Thus, the final part may comprise the polymer and the additives without the solvent. When the solvent is removed, the part may have a viscosity that is substantially similar (e.g., within 5% or within 10%) or the same as the viscosity of the polymer before being dissolved. Accordingly, embodiments of the present disclosure may enable the additive manufacturing of polymers with high viscosities (e.g., having a Mooney viscosity equal to or greater than 40, greater than 60, greater than 80, greater than 100, or greater than 120). Generally, a high viscosity material may be a material, such as a polymer, having a viscosity that is unable (or challenging) to be formed into a desired shape (e.g., additively manufactured, injection molded, compression molded, etc.) without reducing the viscosity. Additionally, by reducing the viscosity of the polymer via dissolution in the solvent, an increased amount of additives may be added to the polymer relative to traditional compounding methods.

The ability to incorporate more additives (e.g., greater than 10%, greater than 20%, greater than 30%, greater than 40%, greater than 50%, greater than 60%, greater than 70%, greater than 80%, or greater than 90% by weight of the part) and the ability to print highly viscous polymers is sought after due to the resulting increased control over the properties of the material and resultant part. For example, filled rubber components, such as O-rings, may be printable using the slurry by dissolving a rubber in the solvent to form the slurry, printing the O-ring, and then removing the solvent from the printed O-ring. Generally, parts may be manufactured with improved characteristics by manufacturing the parts with high-hardness polymers, such as synthetic rubbers or vinyl copolymer elastomers (VCEs), which may lead to improvements in the mechanical strength, flexibility, elasticity, or any other characteristics of the parts. As another example, circuit components may be printed in accordance with embodiments discussed herein, which may alleviate or mitigate issues with thermal expansion and contraction that are often seen in circuitry printed with lower-strength materials. Embodiments of the present disclosure may also reduce the footprint required to fabricate filled polymer parts as compared to forming filled polymer parts by compounding.

Turning now to FIG. 1, a schematic diagram of system 100 for forming a slurry 102 and manufacturing a part 104 using the slurry 102 is illustrated for some embodiments. Slurry 102 may comprise a solvent 106, a polymer 108 soluble in the solvent 106, and one or more additives 110. Polymer 108 may be dissolved in solvent 106 such that slurry 102 may comprise a lower viscosity than the viscosity of polymer 108, thereby enabling utilization of the slurry 102 with a manufacturing device. After utilizing slurry 102 in the manufacturing process (e.g., additive manufacturing, injection molding, compression molding, transfer molding, casting, coating, spraying, painting, or foaming), solvent 106 may be removed to return polymer 108 to an original state (e.g., the state of polymer 108 before dissolving in solvent 106) thereby forming part 104.

Generally, solvent 106 may be any solvent capable of dissolving polymer 108. The solvent 106 may also be selected based at least in part on any physical and/or chemical characteristic of the solvent 106, such as the polarity, the dielectric constant, the viscosity, the volatility, or any combination thereof. In some embodiments, the solvent is tetrahydrofuran (THF). In some embodiments, solvent 106 comprises any of THF, acetone, toluene, or hexane, or any other solvent.

Polymer 108 may be any polymer that is soluble in solvent 106. In some embodiments, polymer 108 may be selected based at least in part on the physical and/or chemical characteristics of the polymer 108. For example, polymer 108 may be selected based on the flexibility and/or hardness of polymer 108. In some embodiments, polymer 108 may be an elastomer, such as a synthetic rubber, a thermoset, or a thermoplastic including thermoplastic elastomers. In some embodiments, polymer 108 may comprise any of vinyl copolymer elastomer, ethylene-vinyl acetate (EVA), polyvinyl chloride (PVC), polyvinyl alcohol (PVA), or polyvinyl ether (PVE), as well as any other suitable dissolvable polymers, plastics, and constituents thereof. Other polymers 108, such as polyolefin, are within the scope hereof. In some embodiments, the slurry 102 comprises more than one polymer 108. For example, multiple polymers 108 soluble in the same solvent 106 may be used to form a slurry 102.

As discussed, it is one advantage of the present disclosure that polymers with high hardness (e.g., greater than 50 Shore 00) may be printed via an additive manufacturing device to form a controlled structure. For example, polymer 108 may have a hardness scale durometer value of at least 50 Shore 00, at least 75 Shore 00, at least 90 Shore 00, at least 15 Shore A, at least 30 Shore A, at least 50 Shore A, at least 75 Shore A, at least 90 Shore A, at least 15 Shore D, at least 30 Shore D, at least 50 Shore D, or at least 75 Shore D.

In addition to enabling various polymers to be additively manufactured, mixing solvent 106 and polymer 108 to form slurry 102 may enable a greater percentage of additives 110 to be added to the polymer 108 as compared to prior methods of incorporating additives into a polymer, such as the use of roll mills and compression presses (e.g., hydraulic presses). The additives 110 may be added to slurry 102 to adjust one or more properties of manufactured part 104. For example, additives 110 may be electrically conductive such that part 104 is electrically conductive. As another example, if the manufactured part 104 is configured to be utilized in a damp environment, the additives 110 may include materials that are non-permeable to water such that water does not permeate manufactured part 104 or the permeability of water through the part 104 is reduced. In another example, part 104 may be a printed circuit board (or circuit board components) and comprise additives 110 that are conductive metals.

In some embodiments, additives 110 comprises nanoparticles, microparticles, powders, carbon nanotubes, metals (e.g., copper, silver, etc.), metal alloys, ceramics, glass, plasticizers, anti-aging stabilizers, anti-static additives, or any combination thereof. In some embodiments, additives 110 are insoluble in solvent 106. The additives 110 being insoluble in solvent 106 may allow for the additives 110 to be dispersed in slurry 102 and, therefore, in manufactured part 104. For example, additives 110 may be dispersed throughout the volume of manufactured part 104. In some embodiments, additives 110 are dispersed equally throughout manufactured part 104. Additives 110 may additionally be unreactive to solvent 106. In some embodiments, the additives 110 are unreactive such that the additives 110 do not physically and/or chemically change when mixed with solvent 106 and polymer 108 to form slurry 102. For example, additives 110 may retain rigidity and/or electrical conductivity (along with any other physical or chemical property) when mixed with solvent 106 and polymer 108 to form slurry 102.

Slurry 102 may be formed with various ratios and/or percentages of solvent 106, polymer 108, or additives 110. In some embodiments, slurry 102 may be described by a ratio of solvent 106 to polymer 108 and a percentage by weight or volume of additives 110 in the solvent-polymer mixture. The ratios and percentages described herein may refer to a weight, volume, or molar basis of any of solvent 106, polymer 108, or additives 110. For example, a 2:1 ratio of solvent 106 to polymer 108 may be used to describe a ratio of 2 grams (g) of solvent 106 to 1 g of polymer 108, a ratio of 2 cubed centimeters ($cm^3$) of solvent 106 to 1 $cm^3$ of polymer 108, or a ratio of 2 moles (mol) of solvent 106 to 1 mol of polymer 108. Further, ranges of ratios or percentages described herein refer to inclusive ranges unless otherwise stated. For example, slurry 102 comprising a range of 10 percent (%) to 15% of additives 110 includes both 10% and 15% in the range.

In some embodiments, a ratio of solvent 106 to polymer 108 in the slurry 102 may be within a range of 1:1 to 5:1, within a range of 3:2 to 4:1, or within a range of 3:2 to 3:1. In some embodiments, a ratio of solvent 106 to polymer 108 in the slurry 102 may be within a range of 1:1 to 1:5 or within a range of 1:1 to 1:2. In some embodiments, the ratio of solvent 106 to polymer 108 in slurry 102 is 2:1. In some embodiments, the slurry 102 comprises at least 5%, at least 10%, at least 15%, at least 20%, at least 25%, at least 50%, at least 75%, or at least 90% of additives 110 by weight or volume. In some embodiments, the slurry comprises a range of 0% to 90%, a range of 0% to 75%, a range of 0% to 50%, a range of 10% to 25%, or a range of 15% to 20% of additives 110 by weight or volume. In some embodiments, any amount of additives 110 may be added to form slurry 102 as long as slurry 102 is able to flow. For example, dissolving polymer 108 in solvent 106 results in a sufficient viscosity such that slurry 102 is able to flow with up to 90% additives 110. Embodiments are contemplated in which slurry 102 does not comprise additives 110 such that slurry 102 comprises only solvent 106 and polymer 108.

The above-described ratios and/or percentages may be selected at least in part on the desired properties of manufactured part 104. For example, a manufactured part 104 configured to be utilized in an electronic device may use a slurry 102 comprising at least 10% by weight of an electrically conductive additive 110 to provide the part 104 with a desired electrical conductivity. In some embodiments, adjusting the ratios and/or percentages of solvent 106, polymer 108, or additives 110 may adjust the properties of slurry 102. For example, a slurry 102 comprising a 4:1 ratio of solvent 106 to polymer 108 may be more viscous than a slurry 102 comprising a 2:1 ratio of solvent 106 to polymer 108.

In some embodiments, during and/or after manufacturing, the solvent 106 of the manufactured part 104 may be removed such that manufactured part 104 has the same or a substantially similar viscosity as the viscosity of the undissolved polymer 108 and/or the undissolved polymer in combination with the additives 110. Accordingly, the final part may comprise substantially only polymer 108 and any additives 110. For example, manufactured part 104 may have the same viscosity of polymer 108 or a viscosity within 5%, within 10%, within 15%, within 25%, within 50%, or within 100% of the viscosity of polymer 108. As solvent 106 is removed from manufactured part 104, polymer 108 may crosslink such that a plurality of chains of polymer 108 are bonded. Generally, the removal of solvent 106 and/or the crosslinking of polymer 108 may return polymer 108 to an undissolved state, such as the state of polymer 108 before dissolving in solvent 106. In some embodiments, additives 110 may be dispersed within part 104 when solvent 106 is removed. In some embodiments, the volatility of solvent 106 is such that the solvent is removable from part 104 at room temperature (e.g., a range of 59 degrees Fahrenheit to 77 degrees Fahrenheit) without additional heating (or other external input) to remove the solvent 106. In other embodiments, the solvent is removed from part 104 by heating part 104 to drive off solvent 106.

System 100 may further comprise a mixer 112 configured to form slurry 102 by mixing solvent 106 with polymer 108, thereby dissolving polymer 108 in solvent 106 such that polymer 108 is flowable and/or usable in a manufacturing process, as discussed above. Mixer 112 may also mix additives 110 with solvent 106 and polymer 108, which may occur during or after dissolving of polymer 108 in solvent 106. In some embodiments, mixer 112 may be any of a resonant acoustic mixer, an orbital mixer, a centrifuge, or any other mixing device or apparatus configured to combine solvent 106, polymer 108, and additives 110 to form slurry 102.

As previously discussed, the formation of slurry 102 may cause gas bubbles to form in slurry 102. Accordingly, in some embodiments, mixer 112 may cause or may be configured to cause degassing of slurry 102 to remove any bubbles formed while mixing slurry 102. For example, when mixer 112 is a centrifuge, the centrifuge may degas the slurry 102. In some embodiments, a degassing device 114 may be provided to degas slurry 102. The degassing device 114 may be integrated with mixer 112 or separate from mixer 112. In some embodiments, degassing device 114 may degas slurry 102 via any method, such as reducing pressure, regulating temperature, separating with a membrane, sparging, introducing ultrasonic waves, or the like. For example, the degassing may be performed by a degassing device 114 that operates at a pressure below atmospheric pressure, such as at vacuum conditions, to facilitate the removal of air bubbles in slurry 102. As another example, degassing device 114 may be a holding tank configured to allow slurry 102 to set such that the gas bubbles are removed over time. In some embodiments, the gas bubbles may be removed naturally over time due to the buoyancy of the gas in slurry 102 and/or the lower viscosity of slurry 102 relative to polymer 108.

System 100 may further comprise a manufacturing device 116 configured to manufacture a part 104 from slurry 102. Manufacturing device 116 may be any of an additive manufacturing device, a transfer molding device, an injection molding device, a compression molding device, a casting device, a coating device, a spraying device, a painting device, or a foaming device. In embodiments in which manufacturing device 116 is an additive manufacturing device, the additive manufacturing device may comprise a build surface configured to receive the slurry 102 and a print head configured to extrude the slurry 102 onto the build surface, among other components (see FIG. 2). The additive manufacturing device may extrude the slurry 102 through the print head onto the build surface to form the manufactured part 104. The additive manufacturing device may be any of a direct ink writing printer, a fused filament fabrication printer, a multi-jet-modeling printer, and/or any other additive manufacturing devices now known or later developed.

In some embodiments, system 100 may further comprise a curing device 118 configured to cure part 104 to obtain a finished part 120. In some embodiments, curing manufactured part 104 causes removal of solvent 106 from the manufactured part 104, which may be necessary when the solvent 106 does not flash off at room temperatures. Further, curing manufactured part 104 may facilitate the crosslinking of polymers 108 of manufactured part 104. Curing device 118 may provide any of heat, UV light, IR light, or low-pressure conditions to cure part 104 and/or drive off solvent 106. For example, curing device 118 may be a heated chamber (e.g., an oven) operated at vacuum or near-vacuum conditions such that the high-temperature (e.g., above room temperature) and low-pressure conditions (e.g., below atmospheric pressure) may facilitate the removal of the solvent 106 from manufactured part 104.

In some embodiments, manufactured part 104 may have a sufficient internal volume so as to inhibit solvent 106 from being effectively removed from an interior of manufactured part 104 before the exterior is sufficiently cured as to trap solvent 106 in the interior or part 104. In such embodiments, manufactured part 104 may require a perforation step to release any trapped solvent 106. In some embodiments, the perforation step involves the use of any combination of a needle, a knife, or a similar object configured to perforate the surface of manufactured part 104. In some embodiments, the perforation step is performed by curing device 118.

Embodiments are contemplated in which curing device 118 may be integrated into manufacturing device 116 such that curing device 118 may cure the manufactured part 104 simultaneously to manufacturing device 116 manufacturing the part 104. For example, curing device 118 may cure manufactured part 104 layer-by-layer during an additive manufacturing process. In some embodiments, curing device 118 may be a heated chamber encompassing at least a portion of the manufacturing device 116. Alternatively, or additionally, manufacturing device 116 may comprise an integral curing device 118, such as a heating device disposed proximate to slurry 102 utilized in manufacturing device 116 and/or a heat source configured to at least a portion of manufacturing device 116. In some embodiments, curing device 118 is not present. Embodiments are contemplated in which additional devices may be utilized to perform further finishing steps or processes on cured part 120. For example, additional mechanical finishing devices, such as a sanding device, may be used to further finish cured part 120. Generally, any post-processing of cured part 120 is contemplated as being within the scope of the present disclosure.

Figure 2:
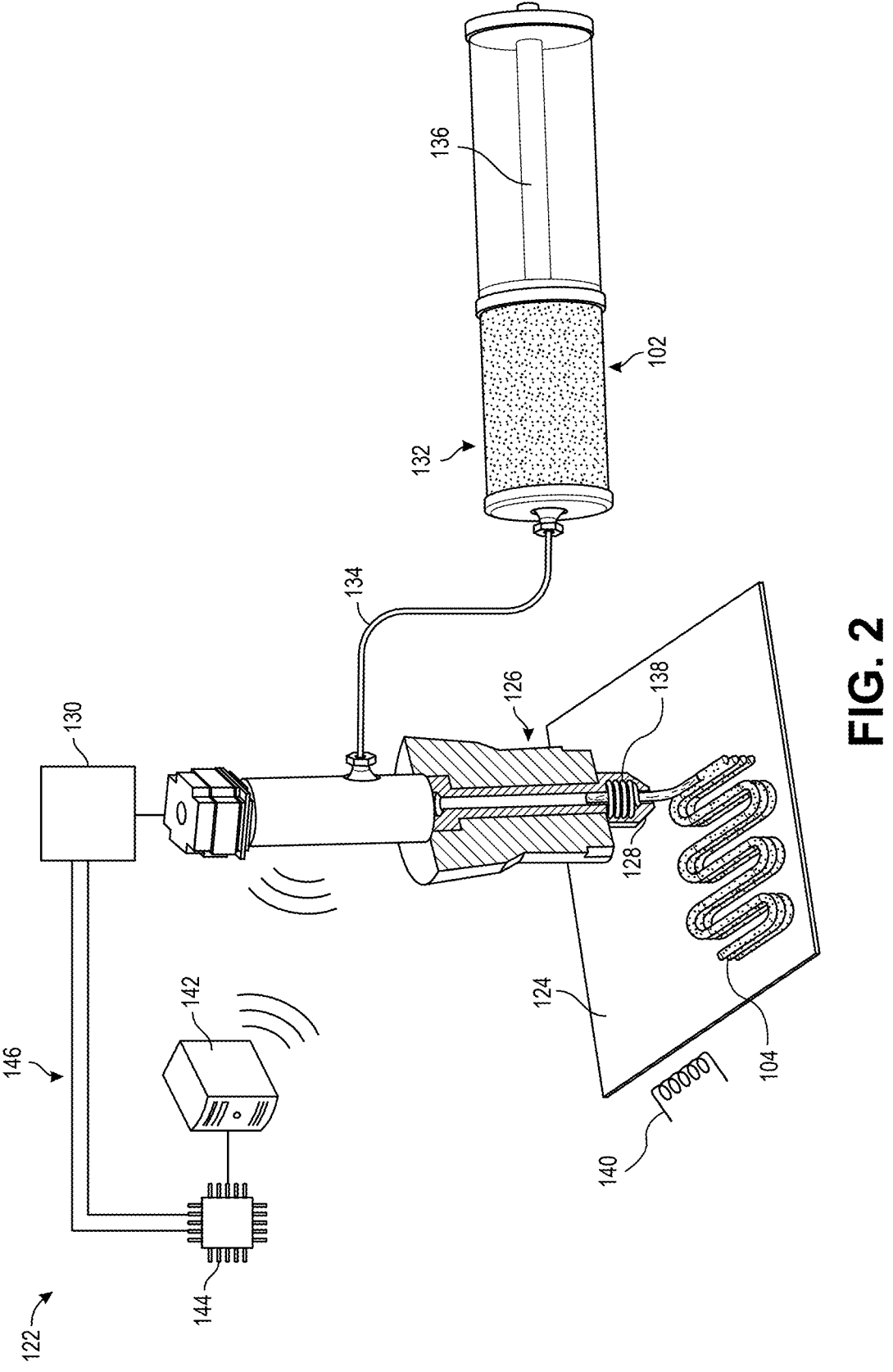
FIG. 2 depicts an additive manufacturing device configured to manufacture the part using the slurry for some embodiments.

FIG. 2 depicts a detailed view of an exemplary additive manufacturing device 122 configured to manufacture part 104 using slurry 102, according to some embodiments of the present disclosure. Additive manufacturing device 122 may comprise a build surface 124 configured to receive the slurry 102 and a print head 126 configured to extrude slurry 102 through a nozzle 128 and onto build surface 124. In some embodiments, additive manufacturing device 122 may further comprise any of a gantry 130, a reservoir 132, a fluid channel 134, a pressurizing device 136, a first heating device 138, a second heating device 140, a computer 142 comprising at least one processor 144, a communication link 146, or any combination thereof. Heating devices 138, 140 may correspond to curing device 118 in some embodiments. In some embodiments, additive manufacturing device 122 may be any of a direct ink writing printer, a fused filament fabrication printer, a multi-jet-modeling printer, and/or any other such additive manufacturing devices.

Embodiments are contemplated in which additive manufacturing device 122 may comprise a plurality of print heads 126 and/or nozzles 128 such that additive manufacturing device 122 may extrude one or more print material slurries 102 simultaneously. In some embodiments, the one or more print material slurries 102 may have different characteristics such that one or more portions of part 104 may have characteristics corresponding to the various print material slurries. For example, manufactured part 104 may have one or more conductive portions formed from a conductive slurry and one or more electrically insulating portions formed from an electrically insulating slurry.

Additive manufacturing device 122 may manufacture part 104 by extruding slurry 102 through print head 126 and onto build surface 124. In some embodiments, additive manufacturing device 122 comprises an integral build surface 124. Alternatively, or additionally, build surface 124 may be separate from additive manufacturing device 122. Build surface 124 may be a planar or non-planar surface. For example, build surface 124 may be the curved surface of a cylindrical object. Build surface 124 may comprise a non-conductive material such as ceramic, ceramic-coated metal, plastic, silicone-coated metal, or any other such heat resistant and/or non-conductive material. In some embodiments, build surface 124 comprises a conductive surface such as a metal. In some embodiments, build surface 124 may be textured to increase the surface area of build surface 124, which in turn may increase the grip of build surface 124 onto the printed part 104. The increased surface area of build surface 124 provided by a textured surface may increase adhesion of a print material extruded through additive manufacturing print head 126. In some embodiments, build surface 124 may further comprise a heating device 140 configured to heat build surface 124 and facilitate the adhesion of manufactured part 104 to build surface 124.

Additive manufacturing device 122 may further comprise gantry 130 configured to control the movement of print head 126 for printing part 104. In some embodiments, print head 126 is directly coupled to gantry 130 of additive manufacturing device 122. In some embodiments, gantry 130 controls the movement of print head 126 along a print path to additively manufacture part 104. In some embodiments, gantry 130 is configured to provide one-, two-, three-, four-, five-, or six-axis movement of print head 126. Alternatively, or additionally, gantry 130 may be operatively coupled to build surface 124 to control the movement of build surface 124. In some embodiments, gantry 130 is configured to provide one-, two-, three-, four-, five-, or six-axis movement of build surface 124. Embodiments are contemplated in which one or more gantries 130 may be utilized to move at least one of the print head 126 or the build surface 124.

In some embodiments, build surface 124 may move with respect to print head 126 via gantry 130 to extrude slurry 102 on build surface 124. For example, build surface 124 may move rotationally, vertically, and/or horizontally such that at least a portion of the surface of the build surface 124 may receive an extruded slurry 102. The movement of the build surface 124 and/or the movement of the print head 126 may allow for parts, such as gaskets and/or O-rings, to be manufactured in a functional position on an object. For example, an O-ring may be printed on an outer surface of a cylindrical tube such that the O-ring does not require manual placing on the tube and can be utilized shortly after manufacture. Build surface 124 may comprise at least a portion of the surface of one or more objects. For example, build surface 124 may be the surface of one or more adjacent objects such that additive manufacturing device 122 may extrude slurry 102 on the surface of each object concurrently or subsequently. In some such embodiments, the objects may be the final location of part 104. For example, build surface 124 may be a laminate PCB base into which traces are printed by using a conductive slurry 102.

Additive manufacturing device 122 may further comprise a reservoir 132 configured to store or otherwise contain slurry 102. Reservoir 132 may be coupled to print head 126 via fluid channel 134 such that reservoir 132 can provide slurry 102 to print head 126 for extrusion through nozzle 128. In some embodiments, reservoir 132 comprises or is coupled to a pressurizing device 136 configured to apply pressure to slurry 102. In some embodiments, the pressure applied to slurry 102 forces slurry 102 through fluid channel 134 connecting reservoir 132 and print head 126.

In some embodiments, pressurizing device 136 may be a piston configured to provide pressure to reservoir 132 such that slurry 102 is forced through fluid channel 134, print head 126, and nozzle 128. In some embodiments, pressurizing device 136 may be an air pump for pumping pressurized air into reservoir 132 and providing a pressurizing force to slurry 102. Generally, any method of providing slurry 102 to the print head 126 for extruding out of nozzle 128 may be employed without departing from the scope of the present disclosure.

In some embodiments, print head 126 may comprise a first heating device 138 disposed proximate to the extruding end of nozzle 128. First device 138 may provide heat to facilitate the removal of solvent 106 while extruding slurry 102 and additively manufacturing part 104. In some embodiments, a second heating device 140 is provided and disposed proximate to the portion of build surface 124 receiving slurry 102. For example, second heating device 140 may provide heat after each layer of slurry 102 has been extruded.

In some embodiments, additive manufacturing device 122 receives commands from computer 142 to move print head 126 and deposit slurry 102 on build surface 124. Additionally, or alternatively, computer 142 may provide instructions to gantry 130 to control the movement of print head 126 and/or build surface 124 such that additive manufacturing device 122 manufactures part 104. In some embodiments, computer 142 is a mobile device such as a cellphone, a tablet computer, a smart watch, or any other such mobile device. In some embodiments, computer 142 comprises at least one non-transitory computer-readable memory storing computer-executable instructions executable by at least one processor 144. In some embodiments, processor 144 comprises a controller, such as a microcontroller. In some embodiments, the computer-executable instructions cause processor 144 to perform a method of additive manufacturing as discussed below with respect to FIG. 4. In some embodiments, computer 142 comprises a user input device such as a mouse and keyboard, a touch pad, a yoke, a joystick, switches, a touch screen, or any other such user input device. In some embodiments, computer 142 comprises a display for displaying information and user interfaces to a user.

In some embodiments, additive manufacturing device 122 may be controlled by computer 142. In some embodiments, computer 142 is communicatively coupled to additive manufacturing device 122 via a communication link 146, such as via USB, LAN, optical fiber, or any other wired communication standard/protocol. In some embodiments, communication link 146 is a wireless link, such as WIFI, BLUETOOTH, satellite, radio, infrared, microwave, or any other wireless communication method.

In some embodiments, any of build surface 124, print head 126, gantry 130, or reservoir 132 may be communicatively coupled to and controlled by computer 142. For example, gantry 130 may receive commands from computer 142 to control the movement of build surface 124 and/or print head 126. Further, reservoir 132 may receive commands from computer 142 to pressurize and apply force to slurry 102 via pressurizing device 136. In another example, build surface 124 and/or print head 126 may receive commands from computer 142 to provide heat proximate the extruded slurry to facilitate the removal of solvent 106.

Figure 3:
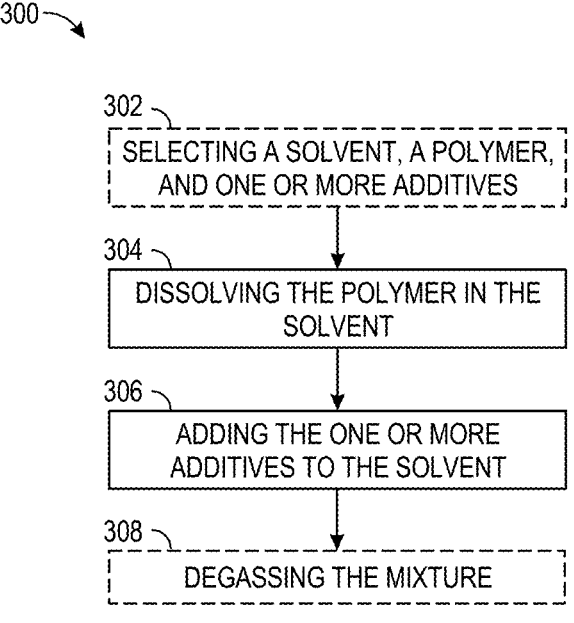
FIG. 3 depicts an exemplary method for forming the slurry for some embodiments.

FIG. 3 depicts an exemplary method 300 for forming slurry 102 for some embodiments of the present disclosure. Method 300 may be performed by the above-described system 100. At optional step 302, solvent 106, polymer 108, additives 110, or any combination thereof may be selected to form slurry 102. Solvent 106, polymer 108, additives 110, or any combination thereof may be selected based at least in part on the desired characteristics of manufactured part 104. Step 302 may further include selecting one or more ratios and/or percentages of solvent 106, polymer 108, and/or additives 110. The one or more ratios and/or percentages may be selected based at least in part on at least one of the above-described criteria for selecting solvent 106, polymer 108, and/or additives 110.

At step 304, a polymer 108 may be mixed with solvent 106 using mixer 112. In some embodiments, step 304 includes dissolving polymer 108 with a first viscosity into solvent 106 such that slurry 102 having a second viscosity less than the first viscosity is formed. Solvent 106 and polymer 108 may be mixed in a ratio such that slurry 102 has a viscosity usable by manufacturing device 116. In some embodiments, the ratio is a 2:1 ratio of solvent 106 to polymer 108.

At step 306, additives 110 may be added to solvent 106 and polymer 108. In some embodiments, additives 110 may be added to adjust the properties of the manufactured part 104. For example, additives 110 may comprise electrically conductive materials such that manufactured part 104 is electrically conductive. In some embodiments, additives 110 are insoluble in solvent 106 such that the additives 110 disperse in slurry 102 and may be equally dispersed in manufactured part 104. For example, additives 110 may comprise a metal nanoparticle such that slurry 102 may be a mixture of a solid and a liquid that is utilized to manufacture part 104 comprising polymer 108 and the additives 110 dispersed in the polymer.

In some embodiments, step 304 and step 306 are performed sequentially such that solvent 106 and polymer 108 are mixed to form the solvent-polymer mixture prior to adding additives 110. In some embodiments, step 304 and step 306 may be performed simultaneously such that solvent 106, polymer 108, and additives 110 are mixed at the same time to form slurry 102. Embodiments are also contemplated in which a portion of the additives 110 may be added and mixed simultaneously with the solvent 106 and polymer 108 and the remaining portion of the additives 110 may be added subsequently. Embodiments are contemplated in which step 306 may be optional such that slurry 102 may not include additives 110.

At optional step 308, the slurry 102 may be degassed to remove any air bubbles formed during formation of slurry 102. In some embodiments, degassing may be performed while forming slurry 102. For example, mixer 112 may be used to form slurry 102 and may simultaneously degas the mixture. In some embodiments, the degassing may be performed after forming slurry 102. For example, degassing device 114 may remove air bubbles from slurry 102. In another example, the air bubbles may be removed naturally over time due to the buoyancy of air in slurry 102 and/or the lower viscosity of slurry 102.

Figure 4:
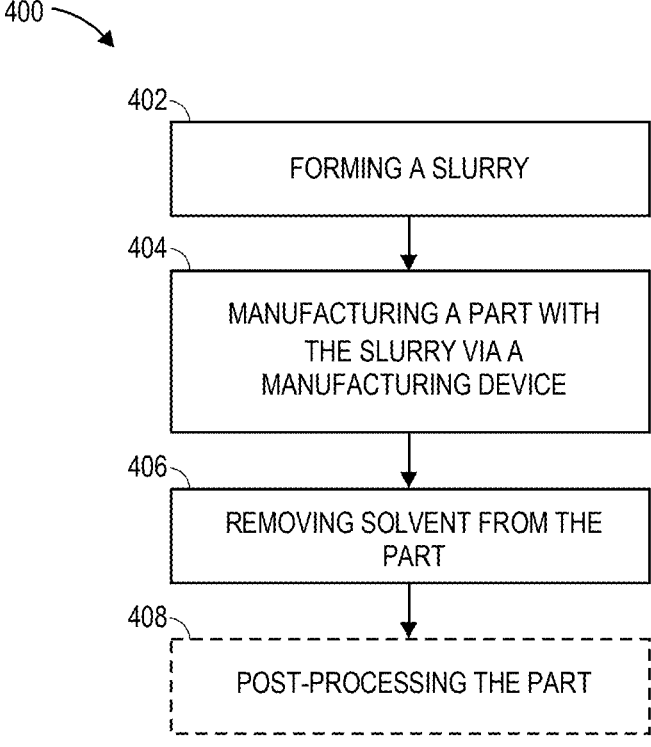
FIG. 4 depicts an exemplary method for manufacturing the part using the manufacturing device for some embodiments.

FIG. 4 depicts an exemplary method 400 for manufacturing a part 104 using a manufacturing device 116 for some embodiments. At step 402, a slurry 102 may be formed by mixing a solvent 106 with a polymer 108 having a first viscosity. In some embodiments, additives 110 may be mixed with the solvent 106 and polymer 108. Further, the mixing includes dissolving polymer 108 in solvent 106 to form the slurry 102, which may have a second viscosity less than the first viscosity of polymer 108. In some embodiments, the lower, second viscosity of slurry 102 allows for slurry 102 to be used in a manufacturing process. For example, polymer 108 may not be too viscous to flow and/or use in a manufacturing process, but polymer 108 dissolved in solvent 106 may be flowable and/or usable as a material for a manufacturing process. In some embodiments, step 402 generally corresponds to some or all of steps 302, 304, 306, and 308 discussed above.

At step 404, a manufacturing device, such as manufacturing device 116 or additive manufacturing device 122 discussed above with respect to FIGS. 1-2, may manufacture a part 104 with slurry 102. In some embodiments, part 104 may be manufactured using any of additive manufacturing, transfer molding, injection molding, compression molding, casting, coating, spraying, painting, or foaming. In some embodiments, slurry 102 may be stored in manufacturing device 116, such as in reservoir 132 of additive manufacturing device 116. Pressurizing device 136 may provide pressure to reservoir 132 to force slurry 102 out of reservoir 132, through fluid channel 134, and into print head 126. Print head 126 may comprise nozzle 128 through which the slurry 102 may be extruded. Other methods of extruding slurry 102 are within the scope hereof.

As previously discussed, additive manufacturing device 122 may further comprise a gantry 130 configured to control movement of the print head 126. Gantry 130 may be controlled by computer 142 that may provide instructions to additive manufacturing device 122 to control the movement of gantry 130. In some embodiments, computer 142 may control any of: the movement of gantry 130, the position and/or movement of print head 126, the position and/or movement of build surface 124, the pressure provided by pressurizing device 136, the temperature of heating device 138, the temperature of heating device 140, the temperature of build surface 124, or any combination thereof.

As discussed above, the viscosity of slurry 102 may allow slurry 102 to flow and be usable with manufacturing device 116. Embodiments are contemplated in which manufacturing device 116 may be any of an additive manufacturing device, a transfer molding device, an injection molding device, a compression molding device, a casting device, a coating device, a spraying device, a painting device, or a foaming device and utilized to manufacture part 104 with slurry 102. Embodiments are contemplated in which manufacturing device 116 may utilize one or more distinct slurries 102 to form part 104. For example, in an injection molding process, manufacturing device 116 may utilize a first slurry and a second slurry distinct from the first slurry to manufacture part 104.

At optional step 406, solvent 106 may be removed from the manufactured part 104. As discussed above, removing solvent 106 from part 104 may crosslink polymer 108 within part 104. In some embodiments removing solvent 106 and/or crosslinking polymer 108 may return polymer 108 to an original state. In some embodiments, the original state refers to the state of polymer 108 prior to mixing with solvent 106 such that manufactured part 104 has the original viscosity of polymer 108.

At optional step 408, manufactured part 104 may be post-processed. In some embodiments, manufactured part 104 may be cured using a curing device 118 as discussed with respect to FIG. 1. Curing the manufactured part 104 may facilitate the removal of solvent 106 from manufactured part 104. Further, curing the manufactured part 104 may facilitate the crosslinking of the polymer 108. As previously discussed, part 104 may need to be perforated to enable the removal of trapped solvent 106. The perforation may occur before, during, or after the curing. In some embodiments, the part 104 is perforated but not cured, such as when solvent 106 is removable at room temperature.

As discussed above, embodiments are contemplated in which curing device 118 may be integrated into manufacturing device 116 such that optional step 408 may be performed simultaneously to step 404 and step 406. For example, curing device 118 may cure manufactured part 104 layer by layer while additively manufacturing part 104. In some embodiments, curing the manufactured part 104 may form a cured part 120. In some embodiments, optional step 408 may further include mechanically finishing manufactured part 104 or performing any other post-processing operations.

While embodiments of the present disclosure have been discussed with respect to the use of slurry 102 in an additive manufacturing process, it is contemplated that the slurry 102 may be used in other various processes. For example, slurry 102 may be utilized in any of a molding process (e.g., transfer molding, injection molding, or compression molding), a casting process, coating process, a spraying process, a painting process, or a foaming process. For use in a molding process, slurry 102 may comprise less solvent when compared to slurry 102 used in an additive manufacturing process such that slurry 102 is more viscous. To state another way, the ratio of solvent to polymer may be lower for molding than for additive manufacturing. A higher viscosity may facilitate slurry 102 retaining a shape during the molding process. Embodiments are contemplated in which slurry 102 may be molded by hand.

For use in a spraying and/or painting process, slurry 102 may comprise more solvent (i.e., a higher solvent-polymer ratio) as compared to a slurry 102 used in an additive manufacturing process such that slurry 102 is less viscous. A slurry 102 with a lower viscosity may facilitate the spraying, painting, and/or spreading of slurry 102. For example, a pressurized canister may spray slurry 102 with a lower viscosity such that a surface may be at least partially covered by slurry 102. In another example, slurry 102 may be painted onto a surface via a brush.

Embodiments are also contemplated in which air bubbles or other gasses may be introduced to slurry 102 to create a foam. The foam may be used to make a porous part comprising polymer 108. For example, solvent 106 may be removed from the foam such that polymer 108 crosslinks and retains the shape of the foam including the pores formed by the air bubbles. In some embodiments, polymer 108 may be a flexible elastomer such that the porous part may be similarly flexible. For example, a foam created from slurry 102 may produce a porous part with the ability to flex and/or be compressed. In some embodiments, the porosity of the porous part may facilitate the flexibility and/or compressibility of the porous part. In some embodiments, the porous part may be utilized as a cushion between a plurality of components and/or surfaces.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for manufacturing polymer parts via additive manufacturing, the system comprising:

a slurry comprising a solvent, one or more additives that are insoluble in the solvent, and an elastomer that is soluble in the solvent, the elastomer having a first viscosity, wherein the solvent dissolves the elastomer to form the slurry having a second viscosity lower than the first viscosity, wherein a ratio of the solvent to the elastomer in the slurry is in a range of 3:2 to 4:1;

a manufacturing device that manufactures a part with the slurry, the manufacturing device comprising:

a build surface configured to receive the slurry; and a print head comprising a nozzle and configured to extrude the slurry through the nozzle onto the build surface to manufacture the part; and a curing device operable at a pressure below atmospheric pressure, the curing device comprising:

a heated chamber encompassing at least a portion of the manufacturing device, the heated chamber configured to heat the part to remove the solvent such that at least a portion of the part has the first viscosity; and a heating device disposed proximate to the nozzle and configured to provide heat to the part while manufacturing the part.

2. The system of claim 1, wherein the one or more additives are electrically conductive.

3. The system of claim 1, wherein the elastomer has a hardness scale durometer value of at least 15 Shore D.

4. The system of claim 1, wherein the elastomer comprises at least one of a vinyl copolymer elastomer, ethylene-vinyl acetate, polyvinyl chloride, polyvinyl alcohol, or polyvinyl ether, wherein the solvent comprises tetrahydrofuran.

5. The system of claim 1, wherein the slurry is a first slurry and further comprising:

a second slurry distinct from the first slurry, wherein the part is formed from the first slurry and the second slurry.

6. The system of claim 1, wherein the slurry comprises at least 10 percent by weight of the one or more additives.

7. The system of claim 1, wherein the elastomer comprises a synthetic rubber.

8. A system for manufacturing polymer parts, comprising:

a slurry comprising a solvent, an elastomer having a first viscosity, and one or more additives, wherein the solvent dissolves the elastomer to form the slurry having a second viscosity lower than the first viscosity;

an additive manufacturing device comprising:

a build surface for receiving the slurry; and a print head comprising a nozzle for selectively extruding the slurry onto the build surface to form a part;

a heated chamber encompassing at least a portion of the additive manufacturing device and operable at a pressure below atmospheric pressure, the heated chamber configured to heat the part to a temperature above room temperature to remove the solvent such that at least a portion of the part has the first viscosity; and a heating device disposed proximate to the nozzle and configured to provide heat to the part while extruding the slurry, wherein the part comprises the elastomer and the one or more additives.

9. The system of claim 8, wherein a ratio of the solvent to the elastomer in the slurry is within a range of 3:2 to 3:1.

10. The system of claim 8, further comprising a mixer configured to form the slurry by mixing the solvent, the elastomer, and the one or more additives.

11. The system of claim 8, wherein the slurry comprises at least 10 percent by weight of the one or more additives.

12. The system of claim 11, wherein at least one of the one or more additives are electrically conductive and insoluble in the solvent.

13. The system of claim 8, wherein the part has the first viscosity.

* * * * *